United States Patent
Vana et al.

(10) Patent No.: US 9,802,716 B2
(45) Date of Patent: Oct. 31, 2017

(54) AIRCRAFT LANDING GEAR DRIVE WHEEL IDENTIFICATION SYSTEM

(71) Applicant: Borealis Technical Limited, North Plains, OR (US)

(72) Inventors: Jan Vana, Prague (CZ); Joseph J. Cox, Portland, OR (US); Isaiah W. Cox, London (GB); Jonathan S. Edelson, Portland, OR (US)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 15/173,966

(22) Filed: Jun. 6, 2016

(65) Prior Publication Data

US 2016/0358484 A1 Dec. 8, 2016

Related U.S. Application Data

(60) Provisional application No. 62/172,039, filed on Jun. 6, 2015.

(51) Int. Cl.

| | |
|---|---|
| *G08G 5/06* | (2006.01) |
| *B64D 47/06* | (2006.01) |
| *B64D 45/08* | (2006.01) |
| *B64C 25/40* | (2006.01) |
| *B64D 41/00* | (2006.01) |
| *B64F 1/00* | (2006.01) |

(52) U.S. Cl.
CPC ............ *B64F 1/002* (2013.01); *B64C 25/405* (2013.01); *B64D 47/06* (2013.01); *B64D 2203/00* (2013.01); *Y02T 50/823* (2013.01)

(58) Field of Classification Search
CPC ..... B64F 1/002; B64D 47/06; B64D 2203/00; B64C 25/405; Y02T 50/823
USPC .......................................................... 701/3
See application file for complete search history.

(56) References Cited

U.S. PATENT DOCUMENTS

| | | |
|---|---|---|
| 4,381,537 A | 4/1983 | Hinrichs |
| 7,101,066 B2 | 9/2006 | Bond |
| 7,445,178 B2 | 11/2008 | McCoskey et al. |
| 8,109,463 B2 | 2/2012 | Cox |
| 8,684,300 B2 | 4/2014 | Wilson et al. |
| 2003/0223243 A1 | 12/2003 | Miller |
| 2004/0257825 A1 | 12/2004 | Choi |
| 2009/0294577 A1 | 12/2009 | Roques et al. |
| 2010/0065678 A1 | 3/2010 | Kiyosawa |

(Continued)

*Primary Examiner* — Brian P Sweeney

(57) ABSTRACT

An identification system and method are provided for aircraft equipped with electric taxi systems for autonomous ground movement that enables airport ground personnel and others outside the aircraft to safely and easily identify the aircraft moving on ground surfaces at an airport as equipped with a pilot-controlled electric taxi system and to distinguish these aircraft from aircraft not moved by electric taxi systems. The identification system may be mounted with nose or main landing gear drive wheels supporting the electric taxi system. The identification system includes an identifying lighting system with lighting elements of a selected number, shape, color, or arrangement positioned on at least a visible face of one or more landing gear wheels. Automatic or manual controls may actuate the identification system to identify electric taxi system-equipped aircraft when the aircraft are moved with the electric taxi system or are stopped.

17 Claims, 2 Drawing Sheets

(56) References Cited

U.S. PATENT DOCUMENTS

2010/0276535 A1    11/2010  Charuel et al.
2015/0154874 A1*  6/2015  Murthy ................... G08G 5/06
                                                                         701/120
2016/0176517 A1*  6/2016  Cox ....................... B64D 43/00
                                                                         244/50

* cited by examiner

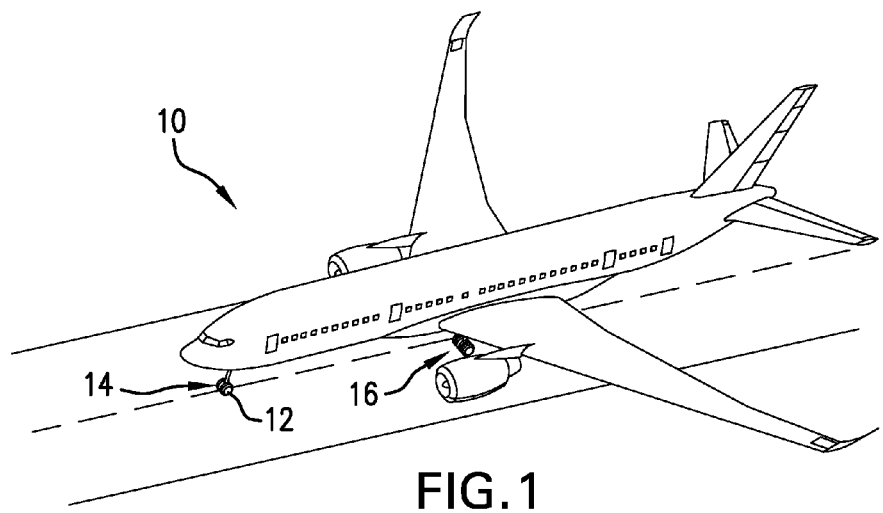
FIG. 1
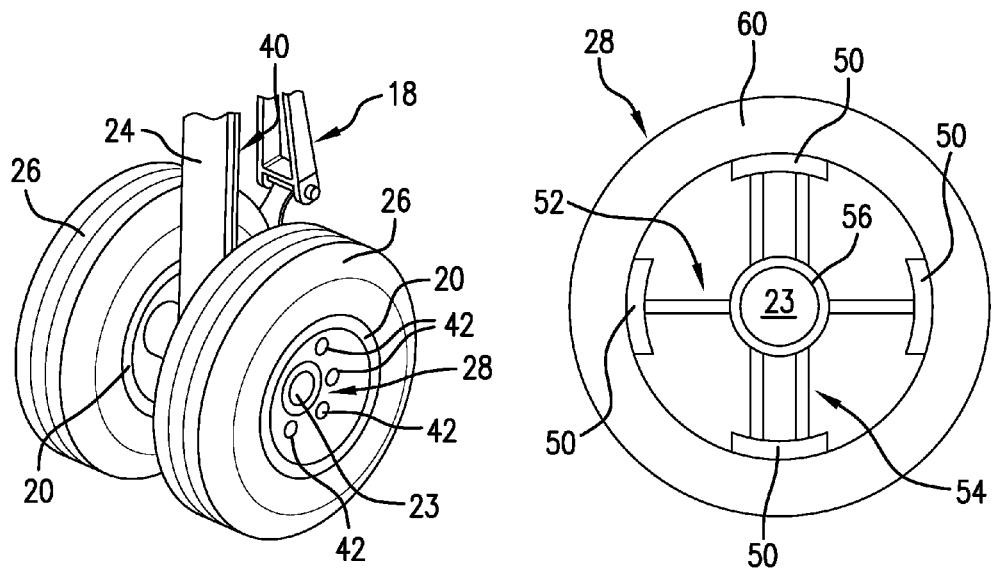
FIG. 3
FIG. 4 ized to US 9,802,716 B2

AIRCRAFT LANDING GEAR DRIVE WHEEL IDENTIFICATION SYSTEM

PRIORITY CLAIM

This application claims priority from U.S. Provisional Patent Application No. 62/172,039, filed 6 Jun. 2015, the disclosure of which is hereby fully incorporated herein by reference.

TECHNICAL FIELD

The present invention relates generally to aircraft landing gear wheels and specifically to an identification system and method for enhancing the safety and efficiency of airport ground operations.

BACKGROUND OF THE INVENTION

Systems to drive aircraft autonomously without operation of aircraft main engines or tow vehicles during ground travel have been proposed and are being developed as "green" or electric taxi systems. One or more aircraft nose or main landing gear wheels are powered by a power source other than the aircraft's main engines to move the aircraft during ground operations. The aircraft landing gear drive wheels in proposed green taxi systems may be powered by hydraulic or pneumatic motors, as well as by electric drive motors, although primary development efforts have focused on electric taxi systems. When these autonomous aircraft taxi systems have been approved by regulatory authorities for installation and use, it is unlikely that all aircraft will have the systems installed and in operation immediately following their approval. Airport ground operations procedures will differ for aircraft moved by electric taxi systems and for aircraft moved by their main engines and by tow vehicles. Consequently, to maintain efficient airport ground operations and avoid delays in aircraft turnaround, a quick and easy way to identify which aircraft are autonomously driven by electric taxi systems and which aircraft are not is needed.

A range of aircraft wheel drive systems has been proposed in the art. U.S. Pat. Nos. 7,445,178 to McCoskey et al; 8,109,463 to Cox et al.; 8,684,300 to Wilson et al.; and U.S. Patent Application Publication Nos. 2009/0294577 to Rogues et al.; 2010/0065678 to Kiyosawa; and 2010/0276535 to Charuel et al are illustrative of various drive systems intended to move aircraft autonomously on the ground. None of these systems, however, suggests any type of apparatus, method, or system specifically designed to identify aircraft that are equipped with the wheel drive systems described therein. Airport ground or control tower personnel viewing the aircraft exterior would not be able to distinguish such wheel drive system-equipped aircraft capable of autonomous ground movement from aircraft that require tow vehicles and operation of main engines for ground movement. Direct communication between an aircraft pilot or cockpit crew and airport personnel is required to confirm the mode of ground movement and what is needed from airport personnel to guide the aircraft's movement in the airport ramp area. Establishing effective direct communication in a congested airport ramp and gate area may be problematic.

Aircraft are usually identified by airline names and logos and/or identifying information on the fuselage exterior. This identifying information does not provide information relating to whether the aircraft is equipped with an electric taxi system, however. Even if it did, such information is not clearly visible at all times when an aircraft is traveling on the ground. Identifying indicia that are clearly and easily visible from a distance are not typically used on or in connection with aircraft landing gear wheels. Systems for enhancing the visibility and appearance of other vehicle wheels have been proposed. U.S. Pat. Nos. 4,381,537 to Hinrichs and 7,101,066 to Bond and U.S. Patent Application Publications Nos. 2003/0223243 to Miller and 2004/0257825 to Choi et al are examples of systems that use arrangements of lights for decoration or illumination on automobile wheels. The Hinrichs system is directed to producing an illusion of movement whether a wheel is rotating or not, and the Bond system uses rechargeable batteries that turn wheel lighting on when the vehicle starts and off when the vehicle is turned off. The Miller system, while primarily decorative and intended to customize an owner's automobile, acknowledges that the lighted wheel described can be seen more clearly at night or in bad weather. The Choi et al system, which is stated to improve safety as well as the appearance of a vehicle, generates electricity to power wheel lighting through the rotation of an axle on which the wheel is mounted. These systems may work well to make automobile wheels more decorative or easily seen, but the structural and functional arrangements described would not translate effectively to an aircraft landing gear wheel environment to identify or enhance the visibility of a drive wheel to identify an aircraft driven with an electric or green taxi system during airport ground operations.

A need exists, therefore, for an aircraft identification system and method for quickly and easily identifying to airport personnel and to flight crews driving aircraft during ground operations which aircraft are equipped with pilot-controlled electric taxi or other green taxi systems for autonomous ground movement while these aircraft are preparing for pushback and driven during pushback and taxi on airport ground surfaces to distinguish them from aircraft are not equipped with such taxi systems. When airport personnel are able to clearly distinguish aircraft equipped with electric taxi systems from aircraft that are not, the requisite ground support services can be efficiently and safely provided for all aircraft using these services at an airport.

SUMMARY OF THE INVENTION

It is a primary object of the present invention, therefore, to provide an aircraft identification system and method for quickly and easily identifying to airport personnel and to flight crews driving aircraft during ground operations which aircraft are equipped with pilot-controlled electric taxi or other green taxi systems for autonomous ground movement as these aircraft are preparing for pushback and driven during pushback and taxi on airport ground surfaces.

It is another object of the present invention to provide an identification system for aircraft equipped with electric taxi for autonomous ground movement that is integral to and operates with an electric taxi drive wheel drive system.

It is an additional object of the present invention to provide an identification system for aircraft equipped with electric taxi for autonomous ground movement that employs a system of lights operated in connection with the operation of the electric taxi system to clearly and distinctly identify one or more electric taxi system drive wheels.

It is a further object of the present invention to provide a lighting system mounted on an aircraft electric taxi system drive wheel that is clearly visible to persons externally of the aircraft at a range of distances and during a range of environmental light and weather conditions.

It is yet another object of the present invention to provide an identifying lighting system for an aircraft electric taxi drive wheel powered by the electrical system that powers the drive wheel drive system or by a dedicated electrical system that powers only the lighting system.

It is yet an additional object of the present invention to provide an identification system for aircraft equipped with electric taxi drive systems that clearly and easily identifies those aircraft operated by a specific airline that are powered by electric taxi systems.

It is yet a further object of the present invention to provide a method for easily and clearly identifying which aircraft at an airport are equipped with electric taxi systems and which aircraft at an airport are not equipped with electric taxi systems to enable airport personnel to conduct ground operations and provide required ground services safely and efficiently.

In accordance with aforesaid objects, an identification system is provided for aircraft equipped with electric taxi for autonomous ground movement that enables airport ground personnel and others outside the aircraft to clearly and easily identify the aircraft as one that is equipped with an electric taxi drive system. The identification system may be integrally mounted with one or more aircraft nose or main landing gear wheels that function as drive wheels to move the aircraft autonomously with the electric taxi system instead of with the aircraft's main engines or tow vehicles. A preferred identification system may include an arrangement of light elements positioned externally on one or more drive wheels that may be powered by the electric power system designed to power the electric taxi system drive system or by another source of electric power. The present identification system, which may be automatically or manually controlled, is designed to operate when the electric taxi system is operating to move the aircraft during ground operations, as well as at other times, as required for safety. The present invention additionally provides a method for quickly and easily identifying which moving and stationary aircraft on an airport's ground surfaces are equipped with electric taxi systems for autonomous ground travel and which are not, enabling airport personnel to safely and efficiently provide the ground services required for each.

Other objects and advantages will be apparent from the following description, claims, and drawings.

BRIEF DESCRIPTION OF THE DRAWINGS

FIG. 1 is a side view of an aircraft equipped with a pilot-controlled electric taxi system for autonomous ground movement without operation of the aircraft's engines or tow vehicles and the identification system of the present invention;

FIG. 3 is a perspective view of an aircraft nose landing gear with an electric taxi system mounted within each of the wheels showing one embodiment of the identification system of the present invention; and FIG. 4 is a view of a second embodiment with one possible arrangement of the face of an aircraft electric taxi system drive wheel showing the wheel hub and components of the identification system of the present invention that are clearly visible when the drive wheel is viewed from a side of the aircraft by persons outside the aircraft.

Description of the Invention

Figure 2:
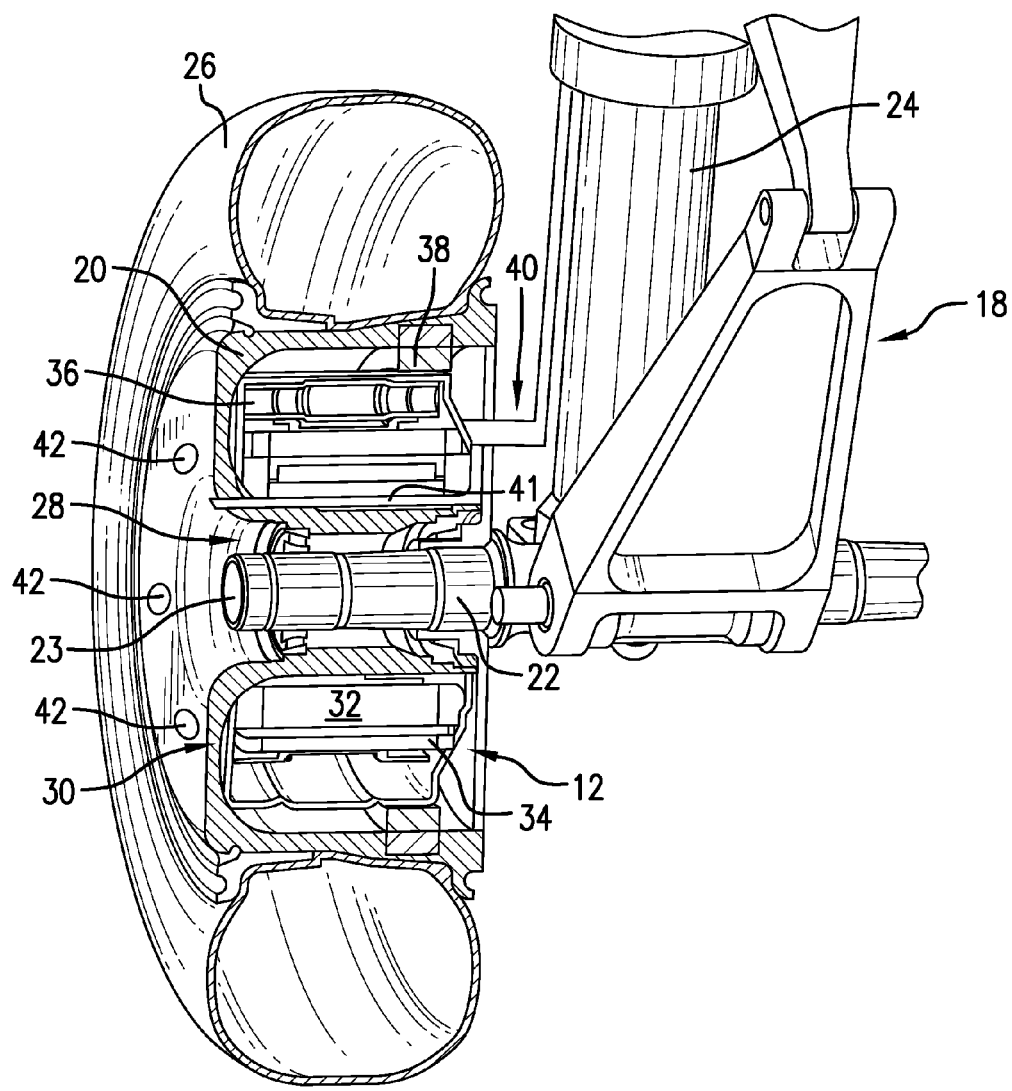
FIG. 2 is a partial cross-sectional view of an aircraft landing gear with components of an electric taxi system mounted to drive a landing gear wheel and elements of a landing gear drive wheel identification system.

Aircraft equipped with pilot-controlled electric or other green taxi systems for autonomous ground movement without operation of aircraft engines or tow vehicles, as noted above, will require different ground operations procedures than aircraft that rely on tow vehicles and operation of main engines for ground movement. Unless all aircraft using an airport are equipped for the same type of ground movement, it is important to have some way to identify which aircraft are driven by pilot-controlled electric taxi and which are not. A system of identifying each type of aircraft is needed to ensure that the requisite ground operations services, personnel, and equipment are available when these services, personnel, and equipment are required. An electric taxi-equipped aircraft, for example, will not need a tow vehicle or tug for pushback, while an aircraft that is not equipped with electric taxi will need a tow vehicle or tug, possibly a tow bar, and ground personnel to attach and detach the tow vehicle or tug, as well as a driver for the tow vehicle or tug. Other ground personnel are needed to guide an aircraft and tug during pushback. Since aircraft main engines are not operating on electric taxi-equipped aircraft, airport ground personnel and ground services vehicles can safely approach these aircraft before they come to a full stop at a gate or parking location without the jet blast and engine ingestion risks that accompany aircraft moved on the ground by operating aircraft main engines. Different numbers and arrangements of ground personnel may be needed to guide each type of aircraft into and out of gates, and the specific procedures for these maneuvers are likely to be different for each type of aircraft. The present invention provides an identification system and method that quickly and easily identifies electric taxi-equipped aircraft to persons outside an aircraft, including ground personnel, tower personnel, and pilots of other aircraft. This identification system and method further enhance the efficiency with which electric taxi-equipped aircraft may travel within congested airport ramp areas, as well as the efficiency with which appropriate ground services may be provided to all aircraft, including those not equipped with electric taxi systems.

Referring to the drawings, FIG. 1 shows an aircraft 10 equipped with the components of an electric taxi system 12 located in the nose landing gear wheel 14 visible in FIG. 1. Both nose landing gear wheels of this aircraft may be equipped with components of the electric taxi system. Alternatively or additionally, one or more main landing gear wheels 16 may be equipped with electric taxi system components, or both nose and main landing gear wheels may be equipped with electric taxi system components. An aircraft landing gear wheel equipped with electric taxi system components, whether a nose landing gear wheel or a main landing gear wheel, is powered by the electric taxi system to drive the aircraft during ground operations, as described below, and is referred to herein as a drive wheel.

The pilot-controlled aircraft electric taxi systems developed by the inventors of the present invention are preferably mounted completely within an aircraft's nose landing gear wheels, but may also be mounted within main landing gear wheels. Each system may include at least an electric motor designed to generate sufficient torque to power the drive wheel in which it is mounted to move an aircraft at a range of desired speeds during ground operations, a drive system, and a torque transfer system controllable to selectively transfer the torque required to power the drive wheel and drive the aircraft through the electric taxi system 12.

FIG. 2 illustrates an aircraft landing gear 18 with one possible arrangement of components of an electric taxi system 12 mounted within an aircraft landing gear wheel 20, which may be a nose landing gear wheel, as shown, or a main landing gear wheel. These components are shown diagrammatically in cross-section relative to each other. Other arrangements and functionally equivalent electric taxi system components are also contemplated to be within the scope of the present invention.

In FIG. 2, the wheel 20 is rotatably mounted on an axle 22 with an outboard end cap 23. The axle 22 may be attached to a conventional landing gear strut 24 at an inboard extent opposite the end cap 23. The wheel 20 supports a tire 26. An outboard wheel hub section 28 may be positioned near the end cap 23 of the axle 22 and may be adapted to secure the wheel 20 to the axle and to support components of the present identification system as described below. All or most of the components of the electric taxi system 12 shown in FIG. 2 may be designed or configured to be housed completely within the volume of the wheel 20 as shown. Other functionally equivalent arrangements of components are also contemplated to be within the scope of the present invention. In the arrangement shown, an electric drive motor 30, preferably with a stator element 32 and a rotor element 34, may be mounted in a portion of the wheel 20 near the axle 22. A drive system 36, which may be an arrangement of gears, a roller traction drive system, or another suitable drive system, may provide torque transfer and speed change functions. A clutch assembly 38 may be activated automatically or manually to engage the drive system into and out of actuation with the drive motor 30, as required, so that the electric taxi system 12 may drive the wheel 20 and drive the electric taxi-equipped aircraft on an airport ground surface. Alternatively, disengagement of the clutch 38 may prevent actuation of the drive motor 30.

Electric power to operate the drive motor 30 may be provided to the drive motor by a wire harness 40 or other suitable wiring connection arrangement. The wire harness 40 may be configured to be connected to a supply of electric power located within the aircraft, such as, for example, the aircraft's auxiliary power unit (APU). The wire harness 40 is shown schematically in one possible location with respect to the landing gear strut 24 and in connection to the drive motor 30. When the wire harness 40 is mounted on a landing gear strut or on another landing gear location that is readily visible when an aircraft's landing gear is extended during ground travel, identifying lighting elements may be mounted on or in connection with the wire harness or a housing for the wire harness. Other wire harness locations that may facilitate mounting of lighting elements to or near the wire harness or its housing to provide lighting for safety and/or identification of an electric taxi-equipped aircraft, as described below, are also contemplated to be within the scope of the present invention.

The electric power source directed to the drive motor 30 may also provide electric power to other components associated with an aircraft electric taxi system that require electric power. One of these elements may be an identification system, such as the system described herein, mounted on an aircraft nose or main landing gear wheel equipped with a pilot-controlled electric taxi system for autonomous ground movement. Components of one embodiment of an aircraft electric taxi system that is equipped with an identification system in accordance with the present invention are shown in FIGS. 2 and 3.

The present invention provides an identification system that clearly and quickly identifies moving and stationary aircraft that are equipped with electric taxi systems in a wide range of light, weather, and other environmental conditions. An arrangement of lights and/or light elements in a selected color and/or pattern may be used to specifically identify aircraft that are driven with pilot-controlled electric taxi systems. A variety of different locations on an aircraft, such as the wire harness location discussed above, could be used for a display of lights in a selected color and/or pattern that identify an aircraft as one that is equipped with and driven by an electric taxi system. A preferred location for mounting an identifying light display in accordance with the present invention will be on the exterior face of the aircraft nose or main landing gear drive wheel or drive wheels where the electric taxi system 12 drive system components are mounted, although other landing gear wheels may also be used when they are more easily seen. The present identification system for pilot-controlled electric taxi system-equipped aircraft will be discussed in connection with aircraft nose landing gear wheels. As noted above, this system may also, or alternatively, be installed on one or more aircraft main landing gear wheels.

FIG. 3 is a perspective view of an aircraft nose landing gear 18 with two wheels 20 rotatably mounted as described in connection with FIG. 2. The outboard wheel hub section 28 may be positioned coaxially and concentrically with the axle end cap 23 and may support one or more lighting elements 42. The outboard wheel hub portion 28 may be adapted to provide a connection to the electric taxi system 12 electric power supply, such as through a channel 41 that may carry an extension of the wire harness 40, more clearly shown in FIG. 2, through the wheel 20 to the hub portion 28. Other electrical connection structures and arrangements may also be employed within the scope of the present invention.

A dedicated source of electric power may also be provided for the drive wheel identification system that does not require a connection to the electric taxi system electric power supply. For example, without limitation, the dedicated source of electric power may be supplied to the identification system lighting elements by brush wiring, a battery system, rotation of rotating wheel structures, or by other power supply structures known in the art.

Alternatively, a supply of power to the drive wheel identification system of the present invention could incorporate a rotary transformer element (not shown) structured to transmit electrical signals from a rotating portion of the drive motor 30 or other rotating wheel structure to the outboard wheel hub 28 to electric connectors (not shown) or an electric connector element (not shown) located and structured to provide electric power for the lighting elements. A rotary transformer may also be connected to an intermediate rotating element (not shown) connected to the outboard wheel hub 28 and to one or more elements that may provide electric power to the lighting elements. A rotary transformer may additionally be configured to transmit power through the wire harness extension channel 41 or through a dedicated wire connection (not shown) between the rotary transformer and lighting elements mounted on the outboard wheel hub portion 28, on the wire harness, or elsewhere on the landing gear 18.

The outboard wheel hub section 28 of the wheel 20 may be modified to support aircraft electric taxi system identifying elements, preferably lights or lighting elements, that require electric power to operate. In the embodiment shown in FIGS. 2 and 3, a number of lights or light elements 42, only some of which are shown, may be spaced concentrically or in another arrangement about the axle end cap 23, on the axle end cap 23, or in other convenient locations on a landing gear wheel's exterior surface where the lights or light 42 elements are readily visible to persons outside the aircraft. The number, spacing, and arrangement of the lights or light elements 42 shown are intended only to be illustrative. Other numbers, arrangements, and configurations of lights, light elements, or lighting could also be used and are contemplated to be within the scope of the present invention. As discussed above, electric power for the lights or light elements 42 may be provided by a range of different electric power supply sources.

FIG. 4 illustrates a second embodiment of a pilot-controlled electric taxi system-equipped aircraft according to the present invention. In this embodiment, an outboard wheel hub portion 28 has a configuration of lights or light elements 50 that is different from the arrangement of lights or light elements 42 shown in FIGS. 2 and 3. In this configuration, a combination of the different lights or lighting elements shown in FIG. 4 may be used together, or individual elements of the combination may be used alone. For example, spaced concentric bars 50 may be positioned outwardly of the axle end cap 23 as shown. The arrangement may also include radial bars 52, 54 in the respective single and/or double configurations shown. Alternatively, radial bars could be arranged and spaced to resemble spokes or another design element (not shown). A concentric ring-shaped light element 56 may also be positioned adjacent to the axle end cap 23. The lights or lighting elements may include only the concentric bars 50, only the single radial bars 52, only the double radial bars 54, only the ring-shaped light element 56, or any combination of these elements. If more than one different light or lighting element shape or location is used, the colors for each type of light or lighting element could be the same or different. Aircraft types or airlines could be identified by specific arrangements of lights or lighting elements, as well as by color combinations or by a single color. Whether one or more types or arrangements of lighting elements or colors are selected for use, the choice is intended to clearly and easily identify an aircraft as one equipped with an electric taxi system to airport personnel and others outside the aircraft as the aircraft is driven by the electric taxi system or is stationary on the ground.

The identification system of the present invention is intended to employ a selected arrangement of colored and/or non-colored lighting, such as the lights or lighting elements 42, 50, 52, 54, and 56 shown in FIGS. 2, 3, and 4, on aircraft with drive wheels driven by an electric taxi system. A clear, light-transmitting wheel cover, represented at 60 in FIG. 4, may be used instead of the non-light transmitting covers typically used to cover aircraft wheel hubs to ensure that the lights or lighting elements of the aircraft identification system are protected and remain clearly visible.

Light emitting diode (LED) lighting may be used as the lights or lighting elements 42, 50, 54, and 56. The use of LED lighting offers an almost infinite range of possibilities. These lights are available in a wide range of colors. As noted above, a specific color may be selected to identify the aircraft as one that is equipped with an electric taxi system. The presence of lights of this color may also designate that the electric taxi system-equipped aircraft is a specific type of aircraft or that the aircraft is associated with a specific airline. It is contemplated that a wide range of lighting colors and patterns may be used for specific aircraft identification purposes. It is noted that simple patterns and distinctive colors are more likely to be effective identifying indicia for electric taxi system-equipped aircraft than more complex arrangements and colors of lights or lighting elements in most airport ramp environments.

Instead of, and/or in addition to, the wheel hub lights or lighting elements described and shown in connection with FIGS. 2-4, an LED lighting strip or individual lighting elements may be mounted on the wire harness 40. A wire harness typically extends from wheel structures to the body of the aircraft, such as along strut 24, to connect the drive wheel electric taxi electrical system to the aircraft source of electric power or aircraft electrical system. Applying an LED or like lighting strip on or near the wire harness housing that tracks the location of the wire harness may provide additional identifying lighting that can be viewed by persons outside the aircraft when the aircraft's landing gear is extended.

To facilitate and enhance identification of aircraft equipped with electric taxi systems, it is contemplated that identifying lights or lighting elements may be mounted, as described above, on wheels, wire harnesses, and/or other landing gear locations on opposite sides of the aircraft so that persons outside the aircraft can clearly see the lights or lighting elements from both sides of the aircraft. In one type of pilot-controlled electric taxi system, both nose landing gear wheels are drive wheels equipped with electric taxi system components. It is contemplated that outboard wheel faces of both nose landing gear wheels will also be equipped with the present aircraft identification and lighting system. Similarly, when main aircraft landing gear wheels are equipped with drive motors for electric taxi, outboard faces of main landing gear wheels that are clearly visible to persons outside the aircraft may be equipped with identifying lighting as described above. As the aircraft is driven on the ground by the electric taxi system, rotation of the drive wheels or the other wheels where the lights are installed very clearly identifies the aircraft as one equipped with an electric taxi system. It will also be helpful to ground personnel and those charged with directing airport ground traffic to be able to identify electric taxi-equipped aircraft when these aircraft are not moving. The present identification system may also provide electric power to drive wheel lighting elements to identify the aircraft as equipped with an electric taxi system when the aircraft is not moving, such as when the aircraft is parked or stopped enroute to or from a runway.

Control of the operation of the electric taxi-equipped aircraft identification system of the present invention may be manual or automatic. It is anticipated that control electronics already provided for an aircraft's electric taxi system may be modified to handle control of wheel lighting for the present aircraft identification system. Appropriate control electronics and systems may automatically or manually control the supply of power to the wheel lights or lighting elements 42, 50, 52, 54, and 56 so that they are lighted when it is determined that identification of an aircraft as one equipped with an electric taxi system is required for safety and/or other considerations. A control system may automatically ensure that the lighting elements of the present identification system are illuminated at all times when an aircraft's electric taxi system is operational and moving the aircraft. In addition, to further enhance safety of airport ground operations, a control system for the present identification system may also be manually or automatically operative to ensure that the lights or lighting elements are illuminated at times when aircraft equipped with electric taxi systems are stationary and not moving. Pushback operations may be handled more efficiently when ground personnel can quickly identify which aircraft parked at gates awaiting departure are equipped with electric taxi systems and which aircraft are not, since pushback operations are quite different for each type of aircraft.

The present invention also provides a method for identifying aircraft using an airport that are equipped with electric taxi systems for autonomous ground movement without operation of aircraft engines or tow vehicles so that the aircraft may be readily and easily identified as electric taxi system-equipped aircraft to persons outside the aircraft at a range of distances and during a range of environmental light and weather conditions. The method provides an identifying lighting system mounted on in a clearly visible location, such as one of the wheel or landing gear locations discussed above and a source of power for the identifying lighting system. A number, shape, and/or color of lighting elements for the lighting system to be mounted is selected that clearly identifies the aircraft and/or the aircraft landing gear drive wheel with the electric taxi system. An aircraft or other source of electric power is provided for the identifying lighting system. The source of electric power is automatically or manually controlled to illuminate the lighting elements in the identifying lighting system when the electric taxi system is operating to move the aircraft autonomously on the ground and/or when the electric taxi system-equipped aircraft is stationary.

The aircraft landing gear drive wheel electric taxi-equipped aircraft identification system described herein has been described with respect to preferred embodiments. Other, equivalent, processes and structures are also contemplated to be within the scope of the present invention.

INDUSTRIAL APPLICABILITY

The electric taxi-equipped aircraft identification system and landing gear drive wheel lighting system of the present invention will find its primary applicability as a system that may be installed on aircraft equipped with electric taxi systems for controlling aircraft ground movement without operation of aircraft main engines or tow vehicles to identify these aircraft when they are moving or stationary, so that ground operations and other services may be provided safely and efficiently at airports where not all of the aircraft using the airport are driven on the ground by electric taxi systems.

The invention claimed is:

1. A system for identifying an aircraft equipped with an electric taxi system for autonomous ground movement without reliance on aircraft engines or tow vehicles, comprising:
   a. an electric taxi system with system components mounted within one or more nose or main landing gear wheels of an aircraft, wherein said electric taxi system components comprise at least an electric drive motor, an activatable drive system, and a source of electric power for said electric taxi system;
   b. an identifying lighting system mounted on a clearly visible outboard face of each of the one or more aircraft landing gear wheels with electric taxi system components mounted within said landing gear wheels, comprising lighting elements of a selected number and type arranged to clearly and easily identify said aircraft to persons outside the aircraft as an aircraft equipped with said electric taxi system and a source of electric power to provide electric power to illuminate said identifying lighting system; and
   c. an automatic or manual control system connected with said electric taxi system and said identifying lighting system activatable to direct electric power from at least one of said electric taxi system source of electric power or said identifying lighting system source of electric power to said identifying lighting system to illuminate the identifying lighting system when said electric taxi system is operating to drive the aircraft during ground movement and when an aircraft equipped with said electric taxi is stopped.

2. The system of claim 1, wherein said lighting elements comprise light emitting diode (LED) light elements selected to be clearly visible to persons externally of the aircraft in a wide range of light, weather, and environmental conditions.

3. The system of claim 1, wherein said identifying lighting system comprises a selected number, shape, or color of said lighting elements mounted in a selected pattern on said outboard face of said one or more aircraft landing gear wheels.

4. The system of claim 3, further comprising a cover element made of a light-transmitting material covering said outboard face of said one or more landing gear wheels.

5. The system of claim 1, wherein said electric taxi system source of electric power and said identifying lighting system source of electric power comprises the aircraft's electrical power system or the aircraft's auxiliary power system.

6. The system of claim 1, wherein said identifying lighting system is alternatively or additionally mounted on a selected landing gear structure visible to persons outside the aircraft.

7. The system of claim 6, wherein said selected landing gear structure comprises a wire harness structure mounted externally on an aircraft nose or main landing gear wheel to provide an electric connection between said electric taxi system and an aircraft source of electric power for said electric taxi system.

8. The system of claim 1, wherein said source of electric power providing electric power to said identifying lighting system comprises a dedicated source of electric power separate from said source of electric power for said electric taxi system.

9. The system of claim 8, wherein said dedicated source of electric power providing electric power comprises brush wiring, a battery system, or a rotary transformer element in electrical contact with a rotating component of said electric taxi system.

10. The system of claim 1, wherein said selected pattern comprises an arrangement of colored or non-colored lighting elements selected to identify a specific airline's aircraft to said persons outside the aircraft.

11. The system of claim 1, wherein said persons outside the aircraft comprise pilots of other aircraft, ground personnel, drivers of ground service vehicles, and airport control tower personnel.

12. A method for identifying aircraft using an airport that are equipped with electric taxi systems for autonomous ground movement without reliance on aircraft engines or tow vehicles to quickly and clearly identify the aircraft as electric taxi-equipped aircraft to persons externally of the aircraft at a range of distances and during a range of environmental light and weather conditions, comprising
   a. in aircraft equipped with one or more nose or main landing gear wheel-mounted electric taxi systems, providing an identifying lighting system on at least an outboard face of at least one landing gear wheel that is clearly visible to persons outside the aircraft;
   b. providing a source of electric power for the identifying lighting system;
   c. selecting a number, shape, color, or arrangement of lighting elements in the identifying lighting system that clearly identifies the aircraft as an aircraft equipped with at least one landing gear wheel-mounted electric taxi system; and d. automatically or manually controlling the source of electric power to illuminate the lighting elements in the identifying lighting system as required when the electric taxi system is operating to move the aircraft autonomously on the ground or when the electric taxi system-equipped aircraft is stationary.

13. The method of claim 12, further comprising additionally or alternatively mounting the identifying lighting system on a wire harness or external landing gear structure clearly visible to persons outside the aircraft.

14. The method of claim 12, further comprising selecting the number, shape, or color of the lighting elements in the identifying lighting system to illuminate the at least one landing gear wheel to be clearly visible to persons externally of the aircraft to identify the airline of the aircraft equipped with said electric taxi system.

15. The method of claim 12, further comprising automatically controlling the source of electric power to illuminate the lighting elements of the identifying lighting system only when the electric taxi system is operating to move the aircraft autonomously on the ground.

16. The method of claim 12, further comprising automatically or manually controlling the source of electric power to illuminate the lighting elements of the identifying lighting system when the electric taxi system is operating to move the aircraft autonomously on the ground and when the electric taxi system-equipped aircraft is stationary to identify moving and stopped aircraft as equipped with electric taxi systems.

17. The method of claim 12, further comprising mounting the identifying lighting system on an outboard face of nose main landing gear wheels on opposite sides of the aircraft so that the identifying lighting systems are clearly visible to persons outside the aircraft viewing the aircraft from opposite sides.

* * * * *